United States Patent
Wright et al.

(10) Patent No.: US 9,654,248 B2
(45) Date of Patent: May 16, 2017

(54) OPTICAL DATA TRANSMISSION METHOD AND APPARATUS

(71) Applicant: BRITISH TELECOMMUNICATIONS PUBLIC LIMITED COMPANY, London (GB)

(72) Inventors: Paul Daniel Wright, London (GB); Andrew Lord, London (GB); Michael Charles Parker, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 0 days.

(21) Appl. No.: 15/028,530

(22) PCT Filed: Oct. 10, 2014

(86) PCT No.: PCT/GB2014/000404
§ 371 (c)(1),
(2) Date: Apr. 11, 2016

(87) PCT Pub. No.: WO2015/052468
PCT Pub. Date: Apr. 16, 2015

(65) Prior Publication Data
US 2016/0241353 A1 Aug. 18, 2016

(30) Foreign Application Priority Data

Oct. 11, 2013 (GB) .................................. 1317987.4
Apr. 24, 2014 (GB) .................................. 1407308.4

(51) Int. Cl.
*H04B 10/00* (2013.01)
*H04J 14/02* (2006.01)

(52) U.S. Cl.
CPC ........ *H04J 14/0267* (2013.01); *H04J 14/026* (2013.01); *H04J 14/0256* (2013.01); *H04J 14/0257* (2013.01)

(58) Field of Classification Search
USPC .................................................. 398/45–57
See application file for complete search history.

(56) References Cited

U.S. PATENT DOCUMENTS 3,259,693 A * 7/1966 Watanabe ............ H04B 14/004
204/224 M
4,731,878 A 3/1988 Vaidya
(Continued)

FOREIGN PATENT DOCUMENTS

EP 1278325 A2 1/2003
EP 1499054 A2 1/2005
(Continued)

OTHER PUBLICATIONS

Bagchi, "Route Selection with Multiple Metrics", Information Processing Letter, Amsterdam, vol. 64, No. 4, Nov. 1997, pp. 203-205, XP000669933.

(Continued)

*Primary Examiner* — Agustin Bello
(74) *Attorney, Agent, or Firm* — Patterson Thuente Pedersen, P.A.

(57) ABSTRACT

A routing and wavelength assignment method for use in an optical fiber network includes (i) identifying a path between each node pair in the network, (ii) identifying a block of spectral resource within the spectrum band of the identified path of a selected node pair, (iii) calculating a spectrum entropy value of the identified path of the selected node pair based on a logarithm of the ratio of the number of wavelength channels in each of the one or more blocks, to the total number of wavelength channels across the spectrum band, (iv) iterating (ii) and (iii) in respect of each of the paths between each other node pair in the network, until a spectrum entropy value of all the paths between all the node pairs has been calculated, (v) summing the spectrum entropy value of all of the paths between all of the node pairs to obtain a network spectrum entropy value in respect of a network configuration based on the paths between the node (Continued)

pairs, and (vi) determining from the network spectrum entropy value whether a signal carrying a demand through the network is separated from any other signals by a spectral gap sufficient to accommodate a change in the demand to an expected level.

14 Claims, 4 Drawing Sheets

(56) References Cited

U.S. PATENT DOCUMENTS

| | | | |
|---|---|---|---|
| 5,586,128 A | 12/1996 | Chen | |
| 6,476,945 B1 | 11/2002 | Archambault | |
| 6,738,354 B1 | 5/2004 | Ashwood Smith | |
| 6,763,190 B2* | 7/2004 | Agrawal | H04J 14/0227 370/216 |
| 6,775,230 B1 | 8/2004 | Watanabe et al. | |
| 6,850,705 B2* | 2/2005 | Su | H04B 10/032 398/5 |
| 7,113,481 B2* | 9/2006 | Elie-Dit-Cosaque | H04J 14/0227 370/238 |
| 7,171,124 B2* | 1/2007 | Smith | H04J 14/0283 398/37 |
| 7,224,897 B1* | 5/2007 | Slezak | H04J 14/0227 398/10 |
| 7,249,169 B2* | 7/2007 | Blouin | H04L 12/2602 709/201 |
| 7,283,741 B2* | 10/2007 | Sadananda | H04L 45/02 398/5 |
| 7,289,730 B2* | 10/2007 | Matsuura | H04J 14/0227 370/395.2 |
| 7,539,210 B2* | 5/2009 | Iovanna | H04L 29/06 370/468 |
| 7,599,621 B2* | 10/2009 | Guy | H04J 14/0227 398/57 |
| 7,725,035 B2 | 5/2010 | Tyan et al. | |
| 7,734,175 B2* | 6/2010 | Amemiya | H04L 41/0806 370/229 |
| 7,843,823 B2* | 11/2010 | Lev-Ran | H04L 69/04 370/230.1 |
| 8,532,496 B2 | 9/2013 | Niven-Jenkins et al. | |
| 8,538,260 B2 | 9/2013 | Niven-Jenkings et al. | |
| 8,666,247 B2* | 3/2014 | Srinivasan | H04L 45/125 398/43 |
| 8,948,048 B2* | 2/2015 | Gerber | H04W 24/08 370/237 |
| 8,954,562 B2* | 2/2015 | Vicente | G06F 9/45533 370/254 |
| 9,020,350 B2* | 4/2015 | Sullivan | H04J 14/026 398/79 |
| 9,166,723 B2* | 10/2015 | Patel | H04J 14/021 |
| 2002/0030867 A1 | 3/2002 | Iannone et al. | |
| 2002/0093703 A1 | 7/2002 | Maeno | |
| 2002/0145783 A1 | 10/2002 | Chang et al. | |
| 2002/0191247 A1 | 12/2002 | Lu et al. | |
| 2003/0007211 A1* | 1/2003 | Gummalla | H04J 3/0608 398/99 |
| 2003/0007212 A1* | 1/2003 | Sala | H04J 3/0608 398/99 |
| 2003/0016414 A1 | 1/2003 | Solheim et al. | |
| 2003/0030866 A1 | 2/2003 | Yoo | |
| 2003/0043427 A1* | 3/2003 | Robidas | H04B 10/032 398/5 |
| 2003/0072052 A1 | 4/2003 | Graves | |
| 2003/0161632 A1 | 8/2003 | Wang | |
| 2003/0198227 A1 | 10/2003 | Matsuura et al. | |
| 2004/0022194 A1 | 2/2004 | Ricciulli | |
| 2004/0120705 A1 | 6/2004 | Friskney et al. | |
| 2004/0208504 A1 | 10/2004 | Solheim et al. | |
| 2004/0220886 A1 | 11/2004 | Kumaran et al. | |
| 2004/0234264 A1* | 11/2004 | Sasaki | B82Y 10/00 398/65 |
| 2004/0246896 A1 | 12/2004 | Hoang et al. | |
| 2004/0246912 A1 | 12/2004 | Hoang et al. | |
| 2004/0246973 A1 | 12/2004 | Hoang et al. | |
| 2004/0258409 A1 | 12/2004 | Sadananda | |
| 2005/0008367 A1 | 1/2005 | Laalaoua | |
| 2005/0069314 A1 | 3/2005 | De Patre et al. | |
| 2005/0069316 A1* | 3/2005 | Vigoureux | H04J 14/0227 398/49 |
| 2006/0002716 A1 | 1/2006 | Guy et al. | |
| 2006/0188252 A1 | 8/2006 | Schluter | |
| 2007/0195700 A1 | 8/2007 | Katoh et al. | |
| 2007/0280686 A1* | 12/2007 | Amemiya | H04L 41/0806 398/51 |
| 2008/0037982 A1 | 2/2008 | Niven-Jenkins et al. | |
| 2008/0056717 A1 | 3/2008 | Niven-Jenkins et al. | |
| 2009/0060505 A1 | 3/2009 | Bernstein et al. | |
| 2011/0262128 A1* | 10/2011 | Madrahalli | H04J 3/12 398/2 |
| 2011/0274101 A1 | 11/2011 | Cooper | |
| 2012/0051745 A1* | 3/2012 | Srinivasan | H04L 45/125 398/58 |
| 2012/0070148 A1* | 3/2012 | Patel | H04J 14/0224 398/49 |
| 2012/0155319 A1* | 6/2012 | Gerber | H04W 24/08 370/254 |
| 2012/0251117 A1 | 10/2012 | Patel | |
| 2012/0294610 A1* | 11/2012 | Genthner | H04J 3/1652 398/45 |
| 2012/0315045 A1* | 12/2012 | Spector | H04Q 11/0067 398/66 |
| 2012/0327953 A1* | 12/2012 | Vokkarane | H04J 14/0267 370/442 |
| 2012/0328286 A1* | 12/2012 | Wang | H04L 43/0882 398/34 |
| 2012/0328296 A1* | 12/2012 | Sullivan | H04J 14/026 398/79 |
| 2013/0033994 A1* | 2/2013 | Parekh | H04L 43/026 370/252 |
| 2013/0266316 A1* | 10/2013 | Xia | H04J 14/0257 398/48 |
| 2013/0272710 A1* | 10/2013 | Wang | H04J 14/0256 398/79 |
| 2013/0272711 A1* | 10/2013 | Patel | H04J 14/0238 398/79 |
| 2014/0016939 A1* | 1/2014 | Patel | H04J 14/0227 398/79 |
| 2014/0029939 A1* | 1/2014 | Patel | H04B 10/07 398/34 |
| 2014/0226985 A1* | 8/2014 | Patel | H04J 14/021 398/79 |
| 2014/0226986 A1* | 8/2014 | Patel | H04J 14/021 398/83 |
| 2014/0334817 A1* | 11/2014 | Miedema | H04Q 11/0062 398/48 |
| 2015/0104166 A1* | 4/2015 | Patel | H04Q 11/0066 398/5 |
| 2015/0249462 A1* | 9/2015 | Chang | H03M 1/122 398/43 |
| 2016/0072608 A1* | 3/2016 | Wright | H04J 14/0241 398/49 |
| 2016/0211916 A1* | 7/2016 | Yang | H04B 10/6161 |
| 2016/0241353 A1* | 8/2016 | Wright | H04J 14/0256 |

FOREIGN PATENT DOCUMENTS

| | | |
|---|---|---|
| EP | 2403169 A1 | 1/2012 |
| EP | 2797247 A1 | 10/2014 |
| JP | 2002064259 A | 2/2002 |
| WO | WO03079596 A1 | 9/2003 |
| WO | WO04002078 A1 | 12/2003 |

OTHER PUBLICATIONS

International Search Report Dated Aug. 18, 2005, International Application No. GB2005/002728, 2 pages.
Japanese Office Action dated Apr. 21, 2010, Japanese Application No. 2007-522008, 2 pages.

(56) References Cited

OTHER PUBLICATIONS

Japanese Office Action dated Oct. 1, 2010, Japanese Application No. 2007-522008, 2 pages.
International Search Report, PCT Application No. PCT/GB2005/002736, dated Oct. 21, 2005.
Application and File History for U.S. Appl. No. 14/786,399, filed Oct. 22, 2015. Inventors: Wright et al.
Application and File History for U.S. Appl. No. 11/632,531, filed Jan. 17, 2007. Inventors: Niven-Jenkins et al.
Application and File History for U.S. Appl. No. 11/632,533, filed Jan. 17, 2007. Inventors: Niven-Jenkins et al.
International Search Report, PCT Application No. PCT/GB2014/000155, mailed Jun. 11, 2014, 2 pages.
M. Zhang et al., *Planning and Provisioning of Elastic O-OFDM Networks with Fragmentation-Aware Routing and Spectrum Assignment (RSA) Algorithms*, Asia Communications and Photonics Conference, OSA Technical Digest, Optical Society of America 2012, 3 pages.
T. Takagi et al., *Dynamic Routing and Frequency Slot Assignment for Elastic Optical Path Networks that Adopt Distance Adaptive Modulation*, Optical Fiber Communication Conference/National Fiber Optic Engineers Conference 2011, OSA Technical Digest (CD), Optical Society of America, Mar. 2011.
W. Xi et al, *Utilization Entropy for Assessing Resource Fragmentation in Optical Networks*, Optical Fiber Communication Conference, OSA Technical Digest Optical Society of America, 2012.
P. Wright et al., "Simulation Results of Shannon Entropy Based Flexgrid Routing and Spectrum Assignment on a Real Network Topology", $39^{th}$ European Conference and Exhibition on Optical Communication (Econ 2013), Sep. 22, 2013, pp. 465-467.
Xi Wang et al., "Utilization Entropy for Assessing Resource Fragmentation in Optical Networks", Optical Fiber Communication Conference and Exposition, 2012 and The National Fiber Optic Engineers Conference, IEEE, Mar. 4, 2012, pp. 1-3.
Norberto Amaya et al., "Introducing Node Architecture Flexibility for Elastic Optical Networks", IEEE, Journal of Optical Communications and Networking, vol. 5, No. 6, Jun. 1, 2013, pp. 593-608.
Klinkowski, Miroslaw et al, "Elastic Spectrum Allocation for Time-Varying Traffic in FlexGrid Optical Networks", IEEE, Journal on Selected Area in Communications, vol. 31, No1. 1, Jan. 1, 2013, pp. 26-38.
Gerstel, Ori et al., "Elastic Optical Networking: A New Dawn for the Optical Layer?", IEEE, vol. 50, No. 2, Feb. 1, 2012, pp. s12-s20.
International Search Report, International Application No. PCT/GB2014/000404, mailed Dec. 11, 2014, 3 pages.

\* cited by examiner

| Source | Dest | PathNum | Link Number | | | | |
|---|---|---|---|---|---|---|---|
| | | | 1 | 2 | 3 | 4 | 5 |
| A | B | 1 | TRUE | | | | |
| A | B | 2 | | TRUE | TRUE | | |
| A | B | 3 | | TRUE | | TRUE | TRUE |
| A | C | 1 | | TRUE | | | |
| A | C | 2 | TRUE | | TRUE | | |
| A | C | 3 | TRUE | | | TRUE | TRUE |
| A | D | 1 | TRUE | | | TRUE | |
| A | D | 2 | | TRUE | | | TRUE |
| A | D | 3 | TRUE | | TRUE | | TRUE |
| B | C | 1 | | | TRUE | | |
| B | C | 2 | TRUE | TRUE | | | |
| B | C | 3 | | | | TRUE | TRUE |
| B | D | 1 | | | | TRUE | |
| B | D | 2 | | | TRUE | | TRUE |
| B | D | 3 | TRUE | TRUE | | | TRUE |
| C | D | 1 | | | | | TRUE |
| C | D | 2 | | | TRUE | TRUE | |
| C | D | 3 | TRUE | TRUE | | TRUE | |

FIGURE 5

| A-B Path | A-B Spec | A-C Path | A-C Spec | A-D Path | A-D Spec | B-C Path | B-C Spec | B-D Path | B-D Spec | C-D Path | C-D Spec |
|---|---|---|---|---|---|---|---|---|---|---|---|
| 1 | 65 | 3 | 34 | 2 | 14 | 1 | 23 | 1 | 14 | 2 | 43 |

OPTICAL DATA TRANSMISSION METHOD AND APPARATUS

PRIORITY CLAIM

The present application is a National Phase entry of PCT Application No. PCT/GB2014/000404, filed Oct. 10, 2014, which claims priority from GB Patent Application No. 1317987.4, filed Oct. 11, 2013, and GB Patent Application No. 1407308.4, filed Apr. 24, 2014, each of which is hereby fully incorporated herein by reference.

TECHNICAL FIELD

Embodiments relate to apparatus, systems and methods relating to optical data transmission, particularly but not exclusively in respect of optimizing the use of optical bandwidth resource in a telecommunications network.

BACKGROUND

The way optical networks are used is undergoing significant change, driven in part by the huge growth of traffic such as multimedia services and by the increased uncertainty in predicting the sources of this traffic due to the ever changing models of content providers over the Internet. Sophisticated modulation schemes for higher bandwidth 100 Gb/s services and beyond are known and come into commercial use in optical networks of large and increasing link and node numbers. A bottleneck to widespread deployment of such schemes is the "fixed" wavelength grid approach specified by the International Telecommunication Union (ITU), in which the relevant optical spectrum range in the C-band is divided into fixed-sized spectrum slots. Such conventional "fixed grid" WDM (wavelength divisional multiplexed) networks work on the concept of a fixed spectrum grid typically with a spacing of typically 50 GHz between channels with 80 to 100 of these channels per fiber. In these networks, an individual signal serving a demand between two nodes in the network has to keep within one of these channels or slots defined by guard bands, as otherwise the signal becomes notched and degraded by the wavelength filters. As a result of this restriction, advanced modulation formats allowing up to 100 Gbit/s per 50 GHz channel commercially and up to 200 Gbit/s experimentally, have not to now been usefully deployed in a widespread manner. This is because the spectral widths of such signals are wider than can be accommodated within the 50 GHz fixed grid spacing, so the potential of additional increases in transmission speed cannot be realized.

As used herein, a "slot", "wavelength" or "channel" is defined as a wavelength or a spectrum of wavelengths associated with a certain signal size. A "carrier" carries a "signal" or "demand" in the known fashion. As is also known, a connection between nodes is made by assigning spectral (i.e. wavelength) slots on the optical links comprising the path between source and destination.

A response to the problems posed by the decade-old ITU fixed grid approach is the flexible grid or "flexgrid", which facilitates a new optical networking paradigm known as EON (elastic optical networking). The EON technologies allow for radically different network design and operation methodologies that can increase the amount of traffic the network can carry compared to conventional WDM networks, but need different processes to make them operate effectively to get the most out of such networks. In the flexgrid approach, the optical spectrum can be divided up flexibly in dependence on requirements, and elastic optical paths (i.e. paths with variable bit rates) can be generated. This allows for operational and functional flexibility in use of both the optical spectrum and transceivers, previously unavailable in fixed grid implementations. In a flexgrid, the spectrum grid is divided into much finer slot widths, e.g. 12.5 GHz or less, compared to the 50 GHz in the fixed grid approach. Significantly, adjacent channels can be joined together to form arbitrary sized slots to carry signals of a variety of widths, allowing for signals ranging in size from an individual channel to that occupying the entire optical spectrum to be carried. Representations of the fixed and flexible grid approaches are depicted in the example graphs shown in FIG. 1, in which graph (a) is a depiction of the fixed grid approach, in which guard bands (2) partition adjoining optical channels (4) occupied by demands or wavelengths at a particular bit rate. Graph (b) illustrates the flexgrid approach used in an EON network, in which the demands (here shown to be of various spectral widths) are not constrained within a slot of pre-defined spectral size. As illustrated by demand (4b) in graph (b) of FIG. 1, a high bitrate demand with a spectral width exceeding fixed grid slot sizes can be accommodated.

Figure 1:
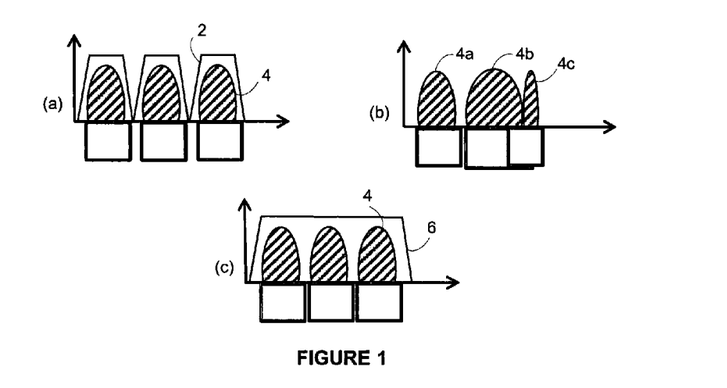
FIG. 1 depicts three graphs respectively illustrating (a) the transmission of demands in a fixed grid system, (b) the transmission of demands in a flexgrid system, and (c) the transmission of demands in a superchannel.

A "superchannel" (depicted in graph (c) of FIG. 1) for carrying demands which are too large to be handled by a single optical channel, can similarly be accommodated in an EON network. A superchannel comprises a grouping of multiple channels and is handled as a single entity, traversing the network for demultiplexing at the receiver end. Specifically, they can be produced by a bandwidth variable transponder (BVT) (a new, known, technology) which can increase its bandwidth as and when required by increasing its spectrum usage. Specifically, the BVT generates carriers which can be aggregated at the transceiver to produce an optical signal of a size which depends on the level of traffic carried by the signal. So if more traffic needs to be carried by the BVT, additional carriers can be added, and conversely if traffic levels decrease, carriers can be disabled. A general description of the use of BVTs in an EON network can be found in "Elastic Optical Networking: A New Dawn for the Optical Layer?" by O. Gerstel, M. Jinno, A. Lord, S J B Yoo (IEEE Communications Magazine, February 2012). The operational flexibility of superchannels can usefully cope with growth in traffic levels in a network over time, and significant spectral savings can be gained over the fixed grid approach. BVTs can be used in both fixed grid and flexgrid systems, although they are deployed to greater effect in flexgrid networks owing to the capacity of the latter to accommodate the greater spectral widths of superchannels.

Figure 2:
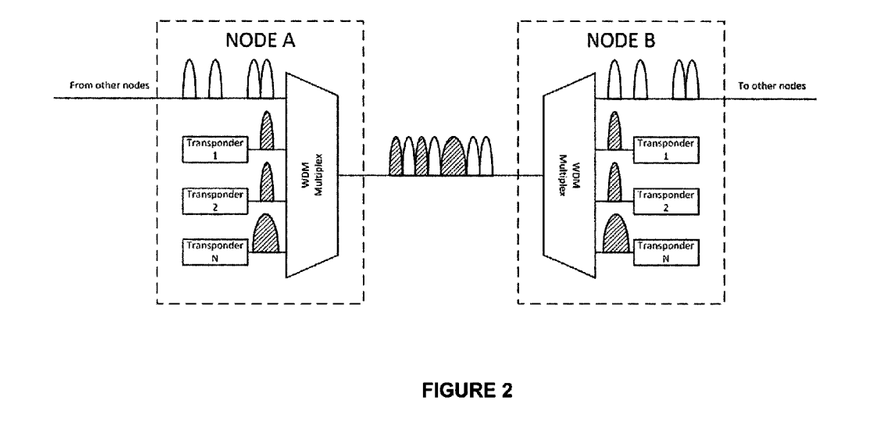
FIG. 2 schematically depicts the operation of a conventional WDM network.

In a conventional WDM network, an optical transceiver or transponder serves to allocate optical spectrum in the form of a channel of the size needed for transmission of the particular signal of a particular bit rate. In an EON network, a slot of the required spectral width would be established to enable the signal to be added. Where signals are already being carried on the relevant link(s), the transponder would find a section of free spectrum of the required size for the purpose. The addition of new signals in this way onto a flexgrid spectrum could result in the formation of a spectrum interstice between the occupied sections, because new carriers/demands are added in a piecemeal fashion as long as its spectral width can be accommodated. Over time, a number of isolated slivers of free spectrum between occupied sections are formed, which are too small unable to accommodate a new signal which typically requires a contiguous block of free spectrum. This fragmentation of the spectrum is graphically depicted in graph (b) of FIG. 1, in which two demands (4a and 4b) have been added in a way so that the section of free spectrum between them is unusably narrow. FIG. 2 depicts the operation of nodes within a conventional WDM network, node A (10) is connected to node B (12) by an optical link (18) comprising spectral resource. In the known manner, the setup in both nodes are functionally similar to each other and each includes a multiplexer (20) and transponders (14) allowing signals or demands (4, 8) to be sent by, and received from, each other. During operation, some of the demands (8) originate from elsewhere and are transiting through the link, so they already pre-occupy a part of the link. A new demand (4) which originates from the sending node itself is served by individual transponders (14) within the sending node, and can be added to the link only if there is a gap of sufficient size, i.e. a block of sufficient spectral resource, for it to be added onto the link by multiplexing with the transiting demands (8).

As traffic levels within the network increase over time, more transponders are added as each transponder can serve only one demand at a time, using different parts of the spectrum and possibly different routes across the network. New demands (whether carried on a single channel of a particular width, or on a superchannel) are added in a piecemeal fashion without any overall planning or strategy. This potentially gives rise to ever-greater levels of optical spectrum fragmentation over time, which results in a situation where routes through the network for new demands (4) cannot be established due by blocking from existing demands (8), even if the cumulative sum of the free spectrum slivers is sufficient for the purpose. A solution at the optical layer to reduce the level of spectrum "entropy" comprising such fragmentation or disorder in an optical resource during operation, is set out in the applicants' co-pending application EP13250053.9. Here, a routing method is proposed with the aim of reducing waste of optical bandwidth, which uses an entropy measure of the link(s), route or network carrying the demand. In this approach, referring to graph (b) of FIG. 1 for example, demands (4b and 4c) are packed in closely to minimize entropy levels so that a contiguous section of free spectrum is left available for addition of new future demands.

Methods of routing traffic based on dynamic demands are known from e.g. US 2007195700, which describes an approach from the perspective of higher networking layers (such as MPLS) and not at the optical layer. US 2008056717 relates to a routing and wavelength assignment in fixed grid network using fixed bandwidth transceivers but taking account of physical layer impairments (e.g. attenuation and polarization mode dispersion) in determining an end-to-end route. This approach follows a system of adding new wavelengths to carry additional traffic being put on the network as and when the requests come in and these could take different routes through the network.

In the case of superchannels (which term shall include those signals or demands which can vary in spectral size over the time) however, the problem related to spectrum availability is different. It is more concerned with the uncertainty of there being sufficient available optical resource on the link to cope when the growth in the superchannel size or demand occurs. There is a need to address the above issues in connection with the manner in which spectrum-related issues can be minimized in their impact on the growth of the spectral width of optical channels in flexgrid implementations in a WDM-based network.

SUMMARY

According to a first aspect, there is provided a routing and wavelength assignment method for use in an optical fiber network, comprising (i) identifying a path between each node pair in the network, (ii) identifying a block of spectral resource within the spectrum band of the identified path of a selected node pair, (iii) calculating a spectrum entropy value of the identified path of the selected node pair based on a logarithm of the ratio of the number of wavelength channels in each of the one or more blocks, to the total number of wavelength channels across the spectrum band, (iv) iterating (ii) and (iii) in respect of each of the paths between each other node pair in the network, until a spectrum entropy value of all the paths between all the node pairs has been calculated, (v) summing the spectrum entropy value of all of the paths between all of the node pairs to obtain a network spectrum entropy value in respect of a network configuration based on the paths between the node pairs, and (vi) determining from the network spectrum entropy value whether a signal carrying a demand through the network is separated from any other signals by a spectral gap sufficient to accommodate a change in the demand to an expected level.

Embodiments are aimed at measuring the entropy value of a network, to allow a routing and spectrum assignment decision to be made to ensure that "enough" bandwidth can be allocated to a signal which changes (typically, increases, as traffic levels rise) in spectral width over time. Considering the levels of spectrum fragmentation or entropy while making such assignment decisions can help in making the fullest use of the precious optical resource. Embodiments may also be thought of as a system which proposes one or more candidate signals carrying demands, determines the network entropy for the candidate signals and determines the suitability of the candidates based on the network spectrum entity. Applications of embodiments will identify good-enough or even optimal network configurations (comprising a particular routing and spectrum block selection between nodes). One implementation of the method is to assess every combination of path and spectrum allocation to find the one with the desired expansion gap, or the maximal gap, which allows for a comparison to be made in respect of the different network configurations (as indicated by the various network entropy values) and selection. This comprehensive approach to configuration assessment can be made speedier and less onerous by using optimization techniques such as by application of a genetic algorithm. The method can be used in respect of individual links between nodes, but it is used to best advantage by considering entropy levels over the network as a whole.

At its core, embodiments use network a spectrum entropy value to find out if signals are separated from each other along the spectral band. In some applications, the extent to which the signals are separated from each other is also measured so as to discover that the gap is sufficient spectrum gap to meet a new bandwidth demand. To this end, one implementation would include determining from the network a spectrum entropy value indicating how far separated each signal is from another signal passing through the network, and on this basis find the routing and spectrum assignment that maximizes the spectral gap between signals.

According to a second aspect, there is provided a method of planning or designing an elastic optical network using the routing and wavelength assignment method according to any preceding claim, to select a network configuration having the highest network spectrum entropy value, or else a network spectrum entropy value indicative that a signal carrying a demand through the network is separated from any other signals by a spectral gap sufficient to accommodate a change in the demand to an expected level.

By considering entropy levels associated with various alternative network configurations (comprising different combinations of routings and spectrum assignments) at the optical layer, a decision can be usefully made at the planning or design stage as to what might be the best fit for a given peak level of network traffic. Priority (in terms of room to grown in respect of spectral resources) may be given to paths between nodes which are known, to anticipated, to be carrying high levels of traffic. For technology such as superchannels, this approach allows allocation of a route and a spectrum block on Day 1 which includes an inherent expansion zone to accommodate growing bandwidth as customer needs change.

According to a third aspect, there is provided an elastic optical network system comprising a plurality optical nodes each being optically linked to each other, each of the plurality of nodes comprising a transponder, a network management system configured to determine if, based on a network spectrum entropy value, a signal being transmitted through the network is surrounded by a spectral gap from any other signals sufficient to accommodate an expected change in the demand level, by calculating a spectrum entropy value of path taken by the signal based on a logarithm of the ratio of the number of wavelength channels in each of the one or more blocks, to the total number of wavelength channels across the spectrum band.

In an exemplary EON network implemented according to an embodiment, the network management system is set up to implement the approach of finding out the entropy values of a network configuration and/or to select between a number of network configurations to find that with the highest, or a "high enough" entropy value suitable for the network operator's purpose.

BRIEF DESCRIPTION OF THE DRAWINGS

Systems, methods and apparatus in accordance with embodiments will now be described by way of example only, with reference to the following drawings, wherein.

DETAILED DESCRIPTION

Figure 3:
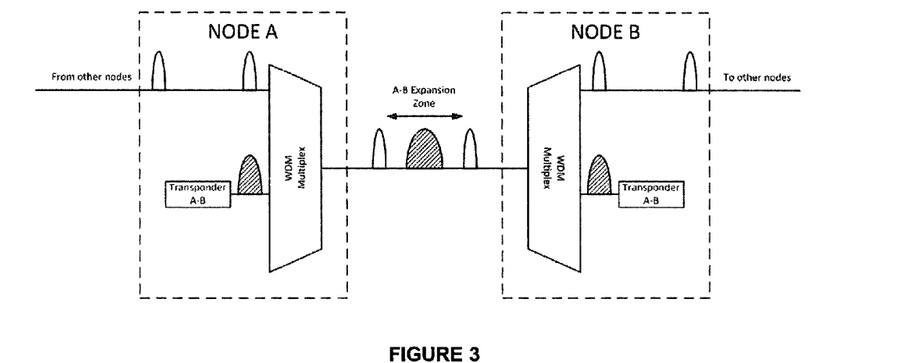
FIG. 3 schematically depicts the operation of a WDM network with a superchannel.

FIG. 3 is a schematic depiction of the transmission of demands between two nodes in a WDM network corresponding in its set up to that shown in FIG. 2, save that the conventional transponders (20) of FIG. 2 are replaced by a single transponder (24) which serves all traffic to be sent between nodes A and B. A signal using generated using the higher modulation formats can be used to carry all the traffic (22), although this suffers from a reduction in the distance it can usefully travel over, and there are relatively low upper limits on its bandwidth. An advantageous implementation makes use of the superchannels mentioned above which has the potential to carry much more traffic, and moreover allows for greater flexibility in operation. In the usual way, this traffic carried by the superchannel between the node pair, is multiplexed onto the link (18) together with signals (8) arriving from and/or going to other parts of the network. As noted earlier, a characteristic of superchannels is that their spectral width can vary in dependence on the demand level carried within it. Packing superchannels tightly in with other demands would remove or reduce the capacity of the superchannel to grow or expand as traffic levels rise. Referring to graph (b) of FIG. 1 by way of example: if demand (4b) were a superchannel, placement immediately next to demand (4c) (perhaps with the misguided aim of reducing spectrum fragmentation) will result in its growth blocked by demand (4c). The advantages of using a superchannel to flexibly operate according to traffic and demand levels cannot then be realized.

An example of a transponder capable of outputting a superchannel (or such other signal type which grow or reduce in spectral width, e.g. signals of different modulation formats output at different times by conventional transponders) are BVTs, which can scale up to operate in terahertz bandwidths and beyond. As previously noted, BVTs are flexible bandwidth transmitters and receivers configured to produce a plurality of closely aggregated channels in a comb-like formation, allowing for carriers are added as traffic to be carried in the channel increase. In implementations of the invention, the traffic between node pairs can be carried by one or more BVTs. In terms of capital and operational expenditure however, it may be most cost-efficient to design the network so that each node only comprises a single BVT. It would be understood by the skilled person that BVTs can be retrospectively adopted into networks which are already in use if the disruption to operations was acceptable or otherwise managed. In such a set up, traffic coming from other networks can be electrically converted at its ingress/egress from the network to the node, thus allowing it to be carried by BVTs across the EON network.

Figure 4:
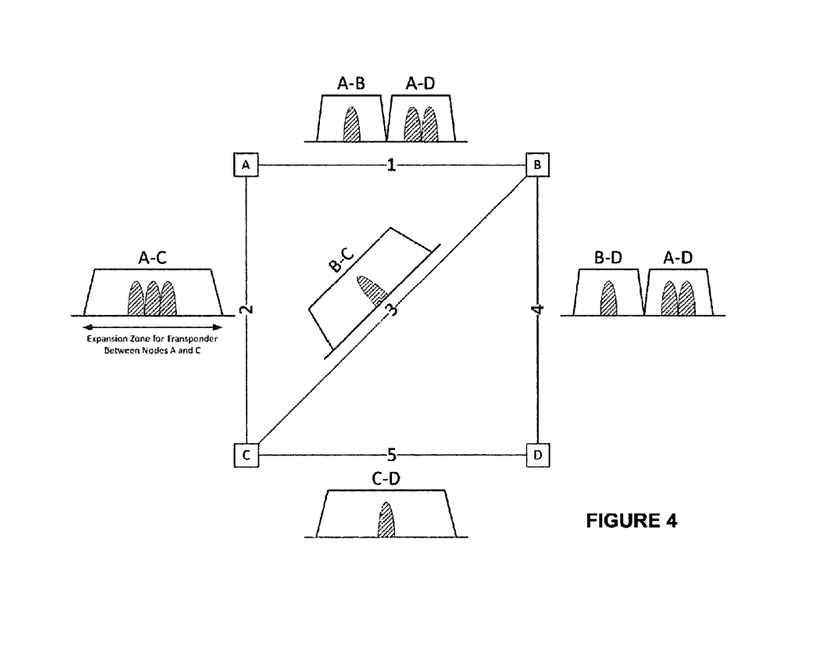
FIG. 4 schematically depicts the configuration and operation of a four-node WDM network according to an embodiment.

Embodiments envisage an EON network in which the one or more signal transceivers serves all the demands transmitted between a particular node pair on carriers which grow and/or contract in spectral width in dependence on customer demands between the two nodes. In the example shown in FIG. 4, the network (34) comprises 4 nodes (A to D) (respectively, 10, 12, 30 and 32), and in an implementation of the invention, each node in this exemplary network would have three transponders that serve each of the other nodes in the network. In planning terms, the size of a WDM optical network (as far as the number d nodes is concerned) is known at the time it is designed and deployed, and typically stays at this size for the life of the network. This information allows an optimal spectrum allocation to be determined from Day 1, wherein initial routing and spectrum and assignment decisions made are based on providing sufficient spectral capacity for the superchannels to grow to forecasted peak levels within the life of the network without colliding with or intruding into the spectrum occupied by other traffic (e.g. other growing superchannels). In an advantageous implementation, the gap between each signal on the link is maximized i.e. the placed as far from each other as possible.

This helps ensure that the superchannel has an "expansion zone" on each side of its initially-allotted spectrum in the manner shown in FIG. 3.

The process for finding an optimal routing and spectrum allocation for each node pair in an EON network using superchannels will now be described.

In the first stage, routes are found for each node pair in the proposed network. The process starts by defining the encoding for the network configuration in terms of the routing and spectrum assignment by means of a sequence of integers, for which the inputs consists of information about the network nodes and fiber links. The discussion below describes the methods using an iterative "genetic algorithm" approach, i.e. a heuristic algorithm which simulates a natural selection process wherein solutions with good characteristics (as measured by a pre-defined metric) are selected to "breed" and produce the next "generation" of potential configurations, so that successive generations produce increasing better results towards achieving a perfect solution through a "survival of the fittest" approach. As implementations of embodiments essentially require that all path and spectrum allocation combinations are tested for their entropy levels, this can be thought of as an optimization measure to guide the process to a swifter, less computationally-intensive resolution. Other optimization algorithms, such as simulated annealing, can also be used.

Figure 5:
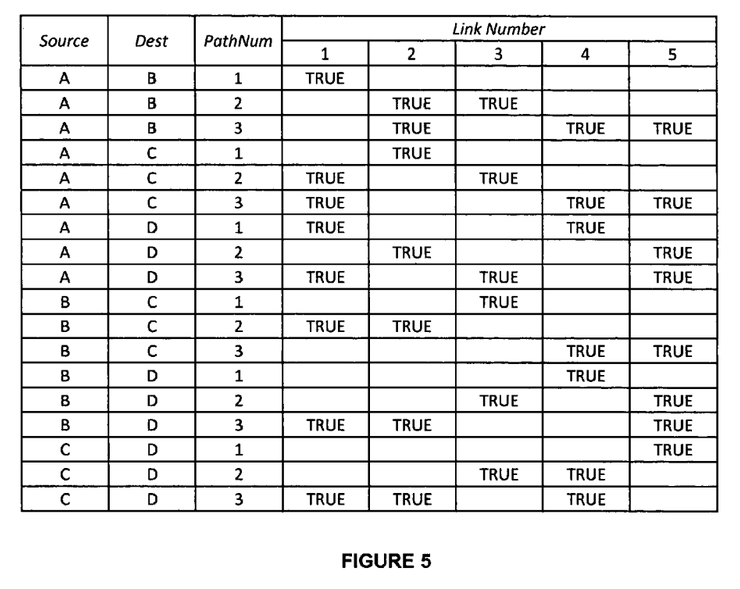
FIG. 5 is a path table for the network depicted in FIG. 4.

In a network of n nodes, there are n*(n−1)/2 unique node pairs. In the four-node network of FIG. 4, there are six node pairs (A-B, A-C, A-D, B-C, B-D and C-D). For the routing of traffic between each of these node pairs, a number of paths are computed based on a standard metric such as number of hops or fiber length and the links that are used in each of these paths are stored in memory. In the four-node example shown in FIG. 4, there are three possible paths per node pair. So for example, the three paths between nodes A and B are respectively link nos. 1, 2-3, and 2-5-4. The calculated results from this part of the process can be stored in the form of the table depicted in FIG. 5, which sets out in the first three entries the three possible paths between nodes A and B, in which PathNum 1 comprises Link Number 1, PathNum 2 comprises Link Number 2 and 3, and PathNum 3 comprises Link Number 2, 4 and 5. Similarly, there are three possible routes PathNum 1, 2, 3 for each of the other node pairs.

Having established the routes between all the node pairs in the network, the process moves on to the second, spectrum assignment, stage. Spectrum in a link can be considered as a number of individual spectral slots (of e.g. 12.5 GHz in width), where each slot is identified by an incrementing number, and this part of the exercise seeks to identify the slot(s) to be occupied by a particular signal. As previously mentioned, the aim is assign spectrum to a potentially-expanding signal on Day 1 in a way which assures that there will be sufficient expansion space immediately adjacent to its initially-assigned slot(s), to accommodate the peak, traffic levels that the particular signal will carry within the life of the network. A network operator might decide on a preferred design policy of initially placing such signals as far from each other as possible on Day 1, allowing maximum room to grow. Assignments typically refer to the middle slot which the signal should occupy, and the invention uses a measure of the spectrum fragmentation or entropy of the network to identify the middle slots allowing for a sufficient, or maximum, expansion zone between signals. An exemplary implementation of this process will now be described.

Figure 6:
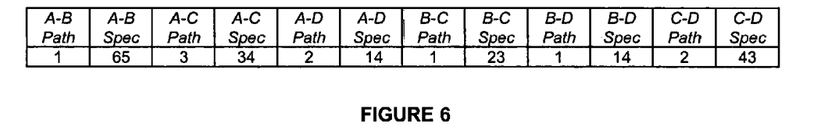
FIG. 6 is a network configuration vector table for the network depicted in FIG. 4.

To encode the spectrum assignment configuration for a network of n nodes, n*(n−1) integers (i.e. sets of numbers that define the routes and spectrum assignments) are required. In the exemplary four-node network of FIG. 4, each link between the nodes (10, 12, 30 and 32) consists of a fiber pair allowing for bidirectional traffic so that the same route and spectrum allocation is given to the signal serving B to C as the one serving C to B. For each of the six node pairs listed above, a particular route out of the list of pre-computed ones (defined in the path table shown in FIG. 5) is recorded along with the middle slot in the spectrum allocation. An example of one such network configuration vector for the four node example, and referencing the path table previously calculated, is shown in FIG. 6. Referring to the left-most entries in the table of FIG. 6, a signal defined between A and B takes pre-computed route (identified by the path column) number 1 and its center wavelength (identified by the "spec" column) is at spectrum slot no. 65. The next two entries indicate that the signal between A and C takes path 3 and spectrum assignment no. 34, and so on for the remaining signals A-D, BC, B-D and C-D.

In an application of an embodiment, the process starts with the optional preliminary task of checking through each network configuration vector (i.e. the sequence of integers that describes the routing and spectrum assignments for all node pairs in the network, of which an example is shown in FIG. 6) to check it is a valid configuration in that there is no signal overlap resulting from the initially-random wavelength allocations assignment made, to ensure that demands do not share the same spectrum allocation on any link in the network. Configurations with overlaps are ignored in the following computations. For all other configurations, a measure of the spectrum entropy is calculated for the link. Advantageously, this is obtained using the following formula previously disclosed in EP13250053.9, of which the description in connection with the "Fragmentation Entropy Metric" is incorporated by reference:

$$-\sum_{i=1}^{N} \frac{D_i}{D} \ln \frac{D_i}{D}$$

where for N blocks of unused spectrum $D_i$ is the number of slots in the current block and $D_i$ is the total number of slots in the entire spectrum band.

An entropy measure for the entire network can be obtained by summing the entropy values of all the links in the network, which is an indication of how separated the signals are from each other. The following pseudo code extract illustrates the process of calculating the entropy value for the network:

Code extract 1 - calculating network entropy

```
1:  CalcNetworkShanonEntropy(NetworkConfiguration)
2:     NetworkEntropy = 0
3:
4:     For Each Link in NetworkConfiguration
```

```
Code extract 1 - calculating network entropy

5:     TotalSlots = count of number a spectrum slots in Link
 6:     LinkEntropy = 0
 7:
 8:     For Each UnusedBlock in LinkSpectrum
 9:         UnusedSlots = count of number of slots in UnusedBlock
10:         LinkEntropy = LinkEntropy + UnusedSlots / TotalSlots * ln(UnusedSlots / Total-
    Slots)
11:     Next Block
12:
13:     NetworkEntropy = NetworkEntropy + Entropy
14:  Next Link
15:
16:  Return -NetworkEntropy
```

Higher network entropy measure values are indicative of greater spectral spacings between signals. To allow sufficient room for signal expansion, a high network entropy value is preferred over lower values. Where it is known at the design stage what the spacing required by signals should be (e.g. based on forecasted levels of customer demand for the life of the network), the network operator can seek a specific level of entropy on a particular link or over the entire network. Based, e.g., on historical usage or forecasted traffic therefore, it may be known that a demand between the large cities of London and Manchester will require greater amounts of bandwidth than other demands in the network based on, and in that case it can planned ahead of time to give this demand a larger slot. Alternatively, a policy of giving each signal as much room to expand as possible will require finding a network confirmation with the highest entropy available.

Advantageously, the above process to establish the overall network entropy level is the first of a number of iterations to discover the set with the high or maximal network entropy value for adoption as the final network design. In a genetic algorithm approach for example, the process is initialized by randomly creating an initial generation (referred to as "generation zero") of network configurations, upon which the above process is carried out. This may be done by filling in the entries in a large number (typically around 5,000) of network configuration vectors. Such vectors can be randomly-selected, or be based on known data from a similar or other network.

Successive generations continue to be generated and tested in the above manner. Advantageously, a measure of "learning" takes places in the production of successive generations of network configurations, in that features from the previous generation which contribute to a high entropy value are included. For example, a network configuration having an entropy value which exceeds a certain threshold entropy value (e.g. such as those solutions that have an entropy that is greater than the average entropy of all solutions in the current generation) can be "bred" together. Here, a number of good network configurations yielding high entropy levels can be "spliced" together at a point in the network configuration vector (resulting in a configuration comprising a combination of configuration features). Another approach is to "mutate" a value in a vector to a new value chosen at random or based on known information in the succeeding generation. In one implementation, the decision to splice or mutate is made at random. A pseudo code extract for the process of discovering a network configuration having the highest network entropy value follows:

```
Code extract 2 - finding maximum entropy network configuration

1: MaxEntRoutingAndSpectrumAssignment(Network)
 2:    NumberOfPaths = 8                          # Number of paths to calculate per node pair
 3:    SpectrumSize = 8000                        # Number of slots in spectrum
 4:    GenerationSize = 5000                      # Number of configurations in each generation
 5:    GenerationThreshold = 0.9 * MAXENT         # Threshold for ideal situation (90% of Maximum
                                                    Entropy)
 6:
 7:    # Determine the pre-computed routes for all node pairs in the network
 8:    Foreach Unique Node Pair
 9:        PathTable += CalculateRoutesThroughNetwork(Source, Dest, NumberOfPaths)
10:  Next Unique Node Pair
11:
12: # Create Generation Zero
13: For n = 0 to GenerationSize
14:     Foreach Unique Node Pair
15:         Path = GetRandomNumber(1, NumberOfPaths)
16:         Spectrum = GetRandomNumber(1, SpectrumSize)
17:         ConfigurationVector(n) += <Path, Spectrum>
18:     Next Unique Node Pair
19: Next n
20:
21: GenerationEntropyAverage = 0
22:
23: # Generate and Evaluate Generations
24: While GenerationEntropyAverage < GenerationThreshold
25:     GenerationEntropySum = 0                  # Used to calculate generation average Entropy
26:     GenerationEntropyCount = 0
```

Code extract 2 -finding maximum entropy network configuration

```
27:
28:    HighestEntropyConfiguration = null     # Used to determine highest Entropy solution
29:    HighestEntropyValue = 0                # in current generation
30:
31:    For n = 0 to GenerationSize
32:       # Check whether current configuration vector is valid (i.e. no overlaps)
33:       IsValid(n) = ValidateConfiguration(ConfigurationVector(n))
34:
35:       If IsValid(n) is True Then
36:          # Calculate the Network Entropy of the current configuration
37:          NetworkEntropy(n) = CalcNetworkShanonEntropy(ConfigurationVector(n))
38:
39:          # Add to average entropy count
40:          GenerationEntropySum = GenerationEntropySum + NetworkEntropy(n)
41:          GenerationEntropyCount = GenerationEntropyCount + 1
42:
43:          # Check whether this is the best configuration of this generation
44:          If NetworkEntropy > HighestEntropyValue Then
45:             HighestEntropyConfiguration = ConfigurationVector(n)
46:             HighestEntropyValue = NetworkEntropy(n)
47:          End If
48:       End If
49:    Next n
50:
51:    # Calculate average entropy for the Generation
52:    GenerationEntropyAverage = GenerationEntropySum / GenerationEntropyCount
53:
54:    # Breed the next generation between those configurations which are above the average network
55:    # entropy
56:    NextGeneration = BreedNextGeneration(ConfigurationVector, IsValid, NetworkEntropy,
57:             GenerationEntropyAverage)
58:
59:    # Make the next generation the current generation
60:    ConfigurationVector = Next Generation
61: Loop
62:
63: # Return the configuration with the highest network entropy
64: Return HighestEntropyConfiguration
```

In the search for the configuration with maximal entropy, the process continues until, e.g., the average entropy value output for of a number of successive generations is no longer increasing, or some other threshold (such as a certain percentage of the maximum network entropy) is reached. The network configuration considered to be most suited (defined as being the one with the largest spectrum entropy value, where it is desired to give signals the greatest expansion zones possible) can be selected and used to configure the network nodes and for allocating future demands. In short, the process of finding a suitable network configuration involves creating a loop to create, analyze and "breed" the next generation, and calls the second extract (in line 37 of extract 2) to calculate the network entropy value for each candidate solution in each generation.

The above "maximum entropy" approach to maximize the spacing between network routings is particularly useful when the peak traffic levels over the life of the network may not be completely known on Day 1 at the design stage. In other circumstances when the network operator has a clear idea of what the peak levels will be, the above methods can be modified to provide a "sufficient" or "high enough" (cf. maximum) expansion zone around the signal(s) to accommodate the expected demand, by generating a metric which is based on the expected traffic loads as well as the network entropy measure. In one implementation, the process involves scaling all the estimated traffic levels and normalizing them so a standard demand which would be given a value of 1. A demand which was anticipated to need double the spectrum of a standard one is given a value 2 and so on.

At line 56 of code extract 2 above, the process would combine the two metrics (entropy and difference from anticipated spectrum allocation) in a preferably weighted fashion (e.g. entropy may form 60%, and allocation form 40% of the overall sum) to obtain a high (or high enough) entropy solution which meets the anticipated spectrum allocations.

Figure 7:
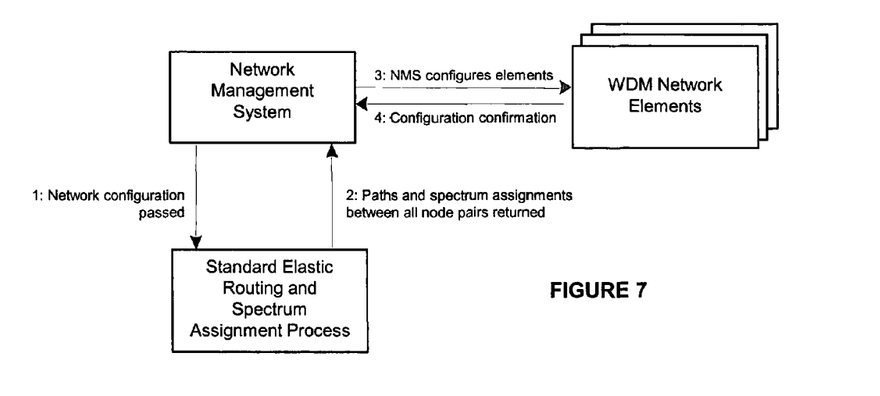
FIG. 7 is a process block diagram depicting known steps of making routing decisions.
Figure 8:
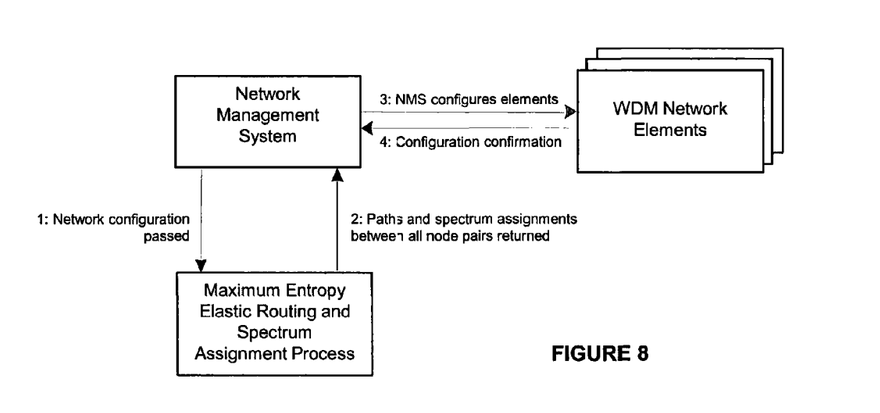
FIG. 8 is a process block diagram depicting operational steps of making routing decisions according to an embodiment.

The network components involved in the above activities will now be briefly discussed in the context of allocating demands in a network designed for conventional routing and assignment techniques (FIG. 7), and a network which configuration is selected for its high or maximum entropy levels (FIG. 8). The two figures are almost-identical block diagrams of the elements controlling the processes and activity flow in a network. In both cases, the main functional block is the network management system (NMS) (50) which sends and receives instructions and has a current view and overall control of the processes. A request for a connection to be made between a node pair is initially sent to the NMS (task 1), which holds or can obtain data about the network state or configuration. This information is then used to discover a suitable path based on the network state, which result differs according to whether the routing and spectrum assignment policies are accord with standard RSA methods (52) or high/maximal entropy principles (54). The identified route and spectrum assignment results are returned (task 2) to the NMS. The WDM network elements in the form of transceivers, which are conventional transponders (56) or which may be BVTs (58} in the respective scenarios as shown, are then configured (task 3) to add the signal along the path identified for that purpose. Configuration that the WDM network element has been configured accordingly is then sent back to the NMS (task 4). It can be seen that a high/maximal entropy-based approach can be deployed within the routing system by the relatively simple replacement of the conventional RSA methods with the process or routine describe above.

The way traffic on superchannels is added or removed from a link or the network will now be specifically described in an EON network designed for high or maximum entropy. To add traffic, the spectral width of the transponders (such as BVTs) connecting two nodes is increased in response. The NMS makes an initial query to discover if there is enough free capacity in the existing carriers to fulfill this new request. If enough capacity is available, the request is allowed, carrier capacity is allocated and the amount of existing free capacity is decreased. If there is insufficient free capacity in the existing carriers, additional carriers will need to be enabled. In this case, the NMS first checks whether there is enough free spectrum in the route between the node pair to enable to enable additional carriers to be added. If free spectrum is not available, then the request is blocked, i.e., the new demand cannot be transmitted. If additional free spectrum is available, then the network manager can enable additional carriers at the extreme ends of the existing carriers (i.e. by growing into the expansion zone on each side of the spectrum already occupied by the carrier, where the growth can be symmetrical or asymmetrical relative to the assigned a block which can be centered about the identified middle spectrum slot). Once these are enabled, the new request can be allowed, carrier capacity is allocated and the amount of current free capacity is updated.

When the NMS receives a request to remove traffic between a node pair, it removes the traffic from the carriers serving that demand and records that the amount of free capacity has now increased. If a carrier is now no longer being used because, e.g., existing traffic can be consolidated, the carriers at the extreme ends of the carrier allocation can be disabled, freeing up additional spectrum, and resulting in the spectral width of the superchannel "shrinking" or reducing towards its middle slot.

The techniques and apparatus described here allow for radically different network design and operation methodologies which can enable a significant increase the amount of traffic the network can carry, when compared to conventional Wavelength Division Multiplexing (WDM) networks, by discovering the spectrum entropy levels in a network of a given configuration, and then using it to find a set of routing and spectrum assignments that maximizes the entropy value in an optimization algorithm for use in an EON design. As noted above, this approach can also be adopted in the existing fixed grid paradigm. However, the resulting solutions may be less efficient owing simply to the nature of the coarser underlying notched spectrum gri9 of a fixed 50 GHz width.

The apparatus, methods and configurations described above and in the drawings are for ease of description only and not meant to restrict the scope of the claims to any particular embodiment. For example, it will be apparent to the skilled person that steps can be added or omitted from the methods and processes described herein. While the examples illustrating application of embodiments are made in respect of an optical network and in particular in connection with flexgrid-based systems, it would be appreciated that other telecommunications systems as well as non-telecommunications systems can suffer from resource fragmentation as well during use, which could benefit from an analysis of entropy levels. Other modifications or extensions to the underlying inventive concept could include adding a weighting to each node pair indicating the amount of traffic that is expected between them, so that nodes pairs forecast to carry a larger amount of traffic, are allocated a larger expansion zone. Other possibilities which might occur to the skilled person is a mixed mode of operation in which a part of the optical spectrum is allocated to this approach and another part of the spectrum is allocated for a conventional approach. While the described implementations are described in the context of network design or planning, it will be appreciated that nonetheless the assignment decisions may be made on the fly and used for each link and/or the network as a whole.

The invention claimed is:

1. A routing and wavelength assignment method for use in an optical fiber network, comprising:
  (i) identifying a path between each node pair in the network;
  (ii) identifying a block of spectral resource within the spectrum band of the identified path of a selected node pair;
  (iii) calculating a spectrum entropy value of the identified path of the selected node pair based on a logarithm of the ratio of the number of wavelength channels in each of the one or more blocks, to the total number of wavelength channels across the spectrum band;
  (iv) iterating (ii) and (iii) in respect of each of the paths between each other node pair in the network, until a spectrum entropy value of all the paths between all the node pairs has been calculated;
  (v) summing the spectrum entropy value of all of the paths between all of the node pairs to obtain a network spectrum entropy value in respect of a network configuration based on the paths between the node pairs; and
  (vi) determining from the network spectrum entropy value whether a signal carrying a demand through the network is separated from any other signals by a spectral gap sufficient to accommodate a change in the demand to an expected level.

2. A method according to claim 1 wherein the calculating at (iii) comprises using the formula:

$$-\sum_{i=1}^{N} \frac{D_i}{D} \ln \frac{D_i}{D}.$$

3. A method according to claim 1 wherein the identifying at (i) comprises identifying a plurality of paths between each node pair in the network so that a plurality of network configurations based on each of the paths between the node pairs are obtained, wherein the summing at (v) comprises summing the spectrum entropy value of a one of the plurality of network configurations, and wherein the summing at (v) is iterated to produce a plurality of network spectrum entropy values, each for a respective network configuration.

4. A method according to claim 3 comprising selecting a network configuration comprising a random one of the paths between each of the node pairs, and a random block of spectral resource within the spectrum band of the selected one of the paths, upon which to carry out (iii) to (v).

5. A method according to claim 4 comprising iterating (i) to (v) in a genetic algorithm process carried out on a plurality of network configurations.

6. A method according to claim 3 wherein the determining at (vi) comprises comparing the plurality of network spectrum entropy values to determine that a signal carrying a demand through the network is surrounded by a spectral gap from any other signals sufficient to accommodate an expected change in the demand level.

7. A method according to claim 6 further comprising selecting the highest network spectrum entropy value from the plurality of network spectrum entropy values.

8. A method according to claim 1 wherein the signal carrying a demand comprises a signal of a spectral width which grows over time.

9. A method according to claim 1 wherein the signal carrying a demand comprises a superchannel transmitted in an elastic optical network.

10. A method according to claim 9 wherein one bandwidth variable transponder in each node generates carriers to carry all traffic between a node pair.

11. A method of planning or designing an elastic optical network using the routing and wavelength assignment method according to claim 1, to select a network configuration based on either the highest network spectrum entropy value, or a network spectrum entropy value indicative that a signal carrying a demand through the network is separated from any other signals by, a spectral gap sufficient to accommodate a change in the demand to an expected level.

12. An elastic optical network system comprising:
a plurality optical nodes each being optically linked to each other;
each of the plurality of nodes comprising a transponder; and
a network management system configured to determine if, based on a network spectrum entropy value, a signal being transmitted through the network is surrounded by a spectral gap from any other signals sufficient to accommodate an expected change in the demand level, by calculating a spectrum entropy value of path taken by the signal based on a logarithm of the ratio of the number of wavelength channels in each of the one or more blocks, to the total number of wavelength channels across the spectrum band.

13. A system according to claim 12 wherein the network management system is configured to select a network configuration based on either the highest network spectrum entropy value, or a network spectrum entropy value indicative that a signal carrying a demand through the network is separated by a spectral gap from any other signals sufficient to accommodate a change in the demand to an expected level.

14. A system according to claim 12 wherein the transponder comprises a bandwidth variable transponder, the signal is carried on a superchannel, and the spectral gap comprises an expansion zone immediately adjacent to a block of spectral resource occupied by the superchannel.

* * * * *